(12) United States Patent
Allbright

(10) Patent No.: US 10,120,921 B2
(45) Date of Patent: Nov. 6, 2018

(54) PARALLEL TRANSFER OF SQL DATA TO SOFTWARE FRAMEWORK

(71) Applicant: MasterCard International Incorporated, Purchase, NY (US)

(72) Inventor: Joshua A. Allbright, Valley Park, MO (US)

(73) Assignee: Mastercard International Incorporated, Purchase, NY (US)

( * ) Notice: Subject to any disclaimer, the term of this patent is extended or adjusted under 35 U.S.C. 154(b) by 391 days.

(21) Appl. No.: 14/918,447

(22) Filed: Oct. 20, 2015

(65) Prior Publication Data

US 2017/0109420 A1    Apr. 20, 2017

(51) Int. Cl.
*G06F 17/30* (2006.01)
*H04L 12/911* (2013.01)

(52) U.S. Cl.
CPC .... *G06F 17/30569* (2013.01); *G06F 17/3033* (2013.01); *G06F 17/30224* (2013.01); *G06F 17/30445* (2013.01); *G06F 17/30501* (2013.01); *H04L 47/726* (2013.01)

(58) Field of Classification Search
None
See application file for complete search history.

(56) References Cited

U.S. PATENT DOCUMENTS

| 7,394,288 | B1* | 7/2008 | Agarwal | G06F 15/7867 326/39 |
| 7,461,236 | B1* | 12/2008 | Wentzlaff | G06F 15/17337 712/10 |
| 2002/0174267 | A1* | 11/2002 | Erdmenger | H04L 67/06 719/330 |
| 2006/0265696 | A1* | 11/2006 | Mayfield | G06F 11/1433 717/137 |
| 2012/0054362 | A1* | 3/2012 | Tsao | H04L 12/66 709/232 |
| 2012/0110309 | A1* | 5/2012 | Lefebvre | G06F 9/30043 712/225 |
| 2014/0324928 | A1* | 10/2014 | Tinker | G06F 17/30203 707/827 |
| 2016/0036716 | A1* | 2/2016 | Pal | H04L 69/329 709/207 |
| 2016/0036903 | A1* | 2/2016 | Pal | H04L 67/1004 709/213 |
| 2016/0246538 | A1* | 8/2016 | Vazhenin | G06F 12/1408 |
| 2016/0294549 | A1* | 10/2016 | Qian | H04L 9/0822 |

* cited by examiner

*Primary Examiner* — Hung Le
(74) *Attorney, Agent, or Firm* — Hovey Williams LLP

(57) ABSTRACT

A system, method, and computer-readable storage medium configured to facilitate the parallel transfer of Structured Query Language (SQL) data to a software framework.

18 Claims, 2 Drawing Sheets

PARALLEL TRANSFER OF SQL DATA TO SOFTWARE FRAMEWORK

BACKGROUND

Field of the Disclosure

Aspects of the disclosure relate in general to machine-to-machine communication of data. Aspects include a method and system to facilitate the parallel transfer of Structured Query Language (SQL) data to a software framework.

Description of the Related Art

A Structured Query Language is a special-purpose programming language designed for managing data held in a relational database management system (RDBMS), or for stream processing in a relational data stream management system (RDSMS).

Based upon relational algebra and Tuple relational calculus, SQL consists of a data definition language and a data manipulation language. The scope of SQL includes data insert, query, update and delete, schema creation and modification, and data access control. Although SQL is often described as, and to a great extent is, a declarative language (4GL), it also includes procedural elements.

SQL is an American National Standards Institute (ANSI) and an International Organization for Standardization (ISO) standard. The standard includes a larger set of features. Despite the existence of such standards, most SQL code is not completely portable among different database systems without adjustments.

A software framework is a universal reusable software environment that provides particular functionality as part of a larger software platform to facilitate development of software applications, products and solutions. Software frameworks may include support programs, compilers, code libraries, tool sets, and application programming interfaces (APIs) that bring together all the different components to enable development of a project or solution.

In computer programming, a software framework can be thought of as an abstraction in which software providing generic functionality can be selectively changed by additional user-written code, thus providing application-specific software. Software frameworks facilitate software development by allowing designers and programmers to devote their time to meeting software requirements rather than dealing with the more standard low-level details of providing a working system, reducing overall development time. For example, a team using a web application framework to develop a banking web site can focus on writing code particular to banking rather than the mechanics of request handling and state management.

SUMMARY

Embodiments include a system, device, method and computer-readable medium to facilitate the parallel transfer of Structured Query Language data to a software framework.

A device embodiment is configured to transferring data from at least one relational database to a software framework. The device includes a processor and a non-transitory computer-readable storage medium. The processor determines a maximum number of parallel database threads for the at least one relational database. The processor load balances the maximum number of parallel database threads, resulting in a load-balanced number of parallel database threads. The processor determines a number of threads per query, and a number of hash buckets to be used by mapping a row of the at least one relational database to the hash buckets. The processor formulates a query to the at least one relational database with the processor resulting in a formulated query. The formulated query including the load balanced number of parallel database and the number of hash buckets. The formulated query assigns the row of the at least one relational database into a hash bucket. The processor receives a query file from the at least one relational database using the formulated query. The query file being stored on the non-transitory computer-readable storage medium. The processor imports the query file into the software framework. The software framework being stored on the non-transitory computer-readable storage medium.

A method embodiment is configured to transferring data from at least one relational database to a software framework. A processor determines a maximum number of parallel database threads for the at least one relational database. The processor load balances the maximum number of parallel database threads, resulting in a load-balanced number of parallel database threads. The processor determines a number of threads per query, and a number of hash buckets to be used by mapping a row of the at least one relational database to the hash buckets. The processor formulates a query to the at least one relational database with the processor resulting in a formulated query. The formulated query including the load balanced number of parallel database and the number of hash buckets. The formulated query assigns the row of the at least one relational database into a hash bucket. The processor receives a query file from the at least one relational database using the formulated query. The query file being stored on a non-transitory computer-readable storage medium. The processor imports the query file into the software framework. The software framework being stored on the non-transitory computer-readable storage medium.

DETAILED DESCRIPTION

One aspect of the disclosure includes the realization that purchasing and using an SQL database is an expensive endeavor. This disclosure refers to a relational database and an SQL database synonymously.

Another aspect of the disclosure is the realization that an open-source software framework is a cost-effective way of processing very large data sets on computer clusters built from commodity hardware.

An aspect of the disclosure is the realization that an open-source software framework may be able to replace an SQL database for very large data sets if there was an efficient way of exporting the data set from the SQL database. In further aspect includes the understanding that while it is possible to move entire SQL tables or partitions of tables, it is much more useful to move the contents of an SQL query. While some open-source software frameworks allow moving contents of an SQL query, they do not do it in parallel effectively.

Embodiments include a system and method of facilitating the parallel transfer of SQL query data to an open-source software framework.

The systems and processes are not limited to the specific embodiments described herein. In addition, components of each system and each process can be practiced independently and separately from other components and processes described herein. Each component and process also can be used in combination with other assembly packages and processes.

Figure 1:
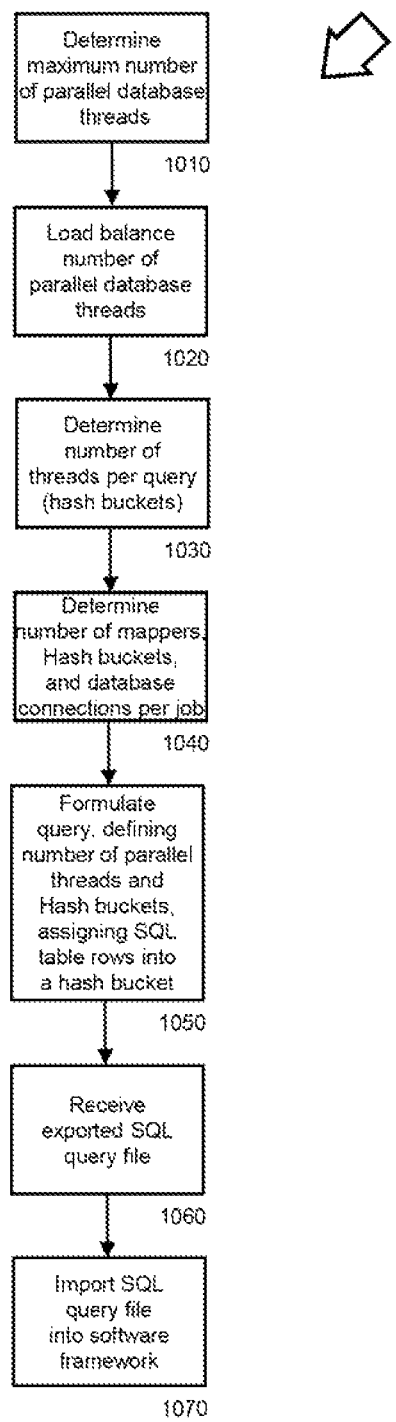
FIG. 1 is flowchart depicting a method to facilitate the parallel transfer of Structured Query Language data to a software framework.
Figure 2:
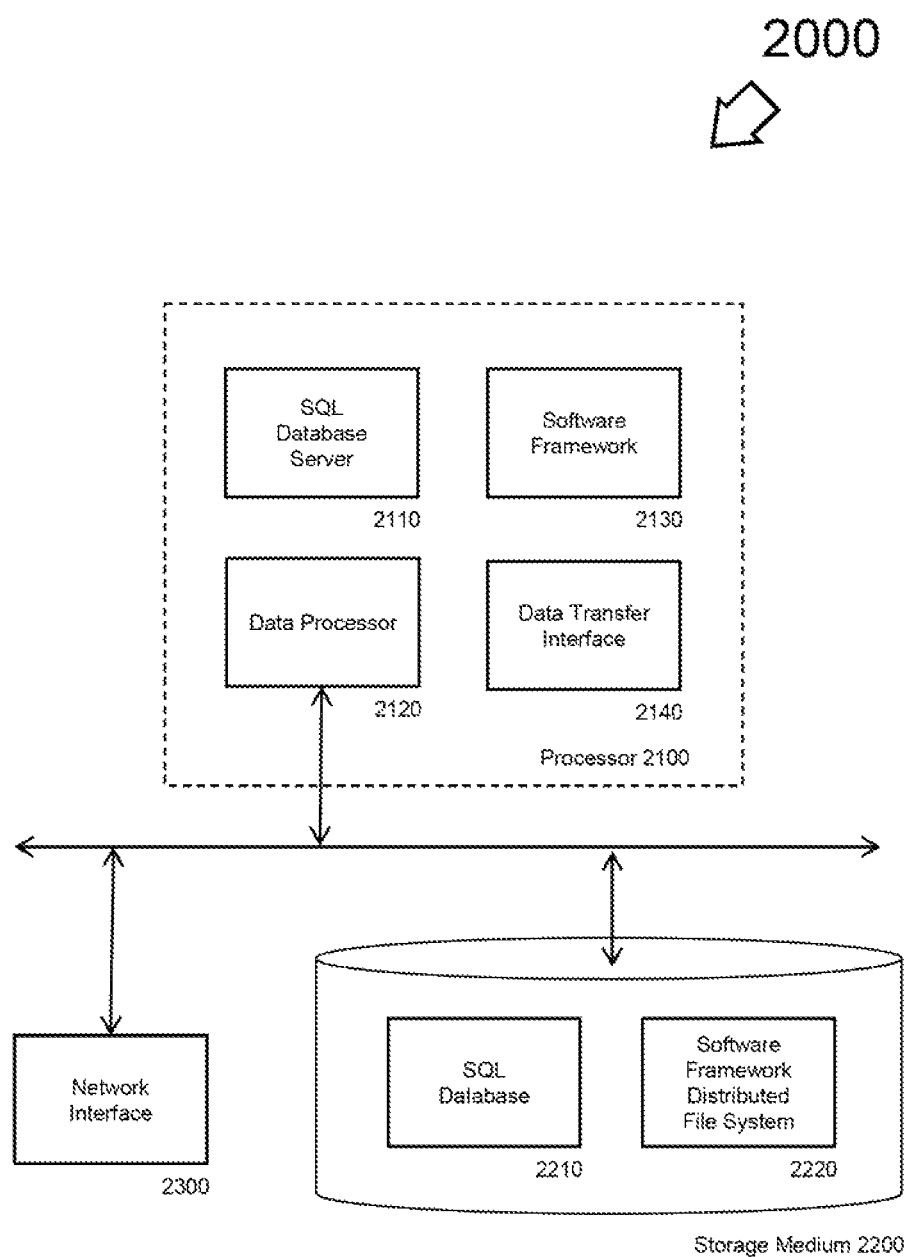
FIG. 2 is a block diagram of an architecture embodiment to facilitate the parallel transfer of Structured Query Language data to a software framework.

FIG. 1 is a flow chart of a process 1000 of facilitating the parallel transfer of SQL query data to an open-source software framework. Process 1000 may be executed by one or more database server 2000, which is depicted in FIG. 2. Both process 1000 and database server 2000 are constructed and operative in accordance with embodiments of the present disclosure. It is understood that a system containing a plurality of database servers 2000 may implement process 1000.

Database server 2000 may run a multi-tasking operating system (OS) and include at least one processor or central processing unit (CPU) 2100, a non-transitory computer-readable storage medium 2200, and a network interface 2300.

Processor 2100 may be a central processing unit, microprocessor, micro-controller, computational device or circuit known in the art. It is understood that processor 2100 may temporarily store data and instructions in a Random Access Memory (RAM) (not shown), as is known in the art.

As shown in FIG. 2, processor 2100 is functionally comprised of a SQL database server 2110, a software framework 2130, a data processor 2120, and a data transfer interface 2140.

Data processor 2120 interfaces with storage medium 2200 and network interface 2300. The data processor 2120 enables processor 2100 to locate data on, read data from, and writes data to, these components.

SQL database server 2110 is the structure that provides database services to other programs or computers using a client-server model, and may store its information in a SQL database 2210. An example SQL database server is Oracle Database, sold by Oracle Corporation of Redwood City, Calif.

Software framework 2130 is a software framework for distributed storage and distributed processing of very large data sets on computer clusters. In some embodiments, software framework 2130 is written in Java programming language. Software framework 2130 may store its data in a software framework distributed file system 2220. In some embodiments, software framework 2130 comprises the modules designed with a fundamental assumption that hardware failures (of individual machines, or racks of machines) are commonplace and thus should be automatically handled in software by the software framework 2130. An example software framework 2130 is Apache Hadoop, developed by Apache Software Foundation (ASF) of Forest Hill, Md.

Data transfer interface 2140 is the structure that facilitates the parallel transfer of SQL data from a SQL database 2210 to a software framework distributed file system 2220. In one embodiment, data transfer interface 2140 uses Apache Sqoop, developed by Apache Software Foundation to help format the SQL data stream.

These structures may be implemented as hardware, firmware, or software encoded on a computer readable medium, such as storage medium 2200. Further details of these components are described with their relation to method embodiments below.

Computer-readable storage medium 2200 may be a read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. In some embodiments, computer-readable storage medium 2200 may be remotely located from processor 2100, and be connected to processor 2100 via a network such as a local area network (LAN), a wide area network (WAN), or the Internet.

In addition, as shown in FIG. 2, storage medium 2200 may also contain a SQL database 2210 and a software framework distributed file system 2220. SQL database 2210 contains a relational database. Software framework distributed file system 2220 splits files into large blocks and distributes them amongst nodes in a database cluster. Software framework transfers packaged code for nodes to process in parallel with microprocessors, based on the data each node processes, resulting in data locality. The data locality allows data to be processed faster and more efficiently that a conventional supercomputer architecture that relies on a parallel file system.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2300 allows database server 2000 to with other database servers.

We now return our attention to a method or process embodiment of the present disclosure, as shown in FIG. 1. It is understood by those known in the art other equivalent implementations can exist without departing from the spirit or claims of the disclosure.

The method 1000 extends capability in data movement between the platforms and increases scale for certain kinds of movement that is otherwise not possible. While data transfer interface 2140 may have built in methods for moving data in parallel from SQL databases 2210 to software frameworks 2130, the fastest methods are limited to moving entire tables or partitions of tables. Moreover, it is much more useful to move the contents of a query. Method 1000 allows moving the contents of any query against an SQL database 2210 to a software framework 2130 at very high levels of parallelism.

Method 1000 employs a hashing function on the rowid of the primary table to evenly bucket rows in the query and have data transfer interface 2140 transfer a bucket of rows per mapper. When setup according the method 1000, each mapper pulls an even number of rows given that the hashing function will spread all the rows into buckets evenly. Method 1000 relies on a number of mappers to be less than or equal to the number of hash buckets. This method only works on an SQL database 2210, such as Oracle Exadata, because the hash function is pushed down to storage. This method works on any SQL database 2210 with built in hash functions or having the ability to specify a user defined function but works particularly well on Oracle Exadata because the hash function is pushed down to storage.

At block 1010, data transfer interface 2140 determines the maximum number of a parallel database threads are available. The maximum threads per SQL database server 2110 is a database parameter. The maximum number of parallel database threads is simply the number of SQL database servers 2110 times the maximum threads per SQL database server. For example, suppose the maximum threads per SQL database server is 280, and there are fourteen SQL database servers 2110 in the system. The maximum number of parallel database threads would be 3920, as 280×14=3920.

Once the maximum number of parallel database threads is calculated, using this number of threads would take up a large processor load. Consequently, the number of parallel threads is load balanced, block 1020. In one example, to avoid overloading the processor 2100, only twenty percent of the maximum number of parallel database threads would be used. Applying the above example, if the maximum number of parallel database threads would be 3920, the load-balanced amount would be 784 threads (20% of 3920). The load balancing may differ depending upon the type of processor 2100 used in the system.

Data transfer interface 2140 determines the number of threads per query at block 1030. From empirical data, approximately four threads per query were found to be optimal by testing 4, 8 and 16 threads per query and measuring runtime. The greater the thread per query, the less number of streams are possible given needing to stay under a set number of parallel threads in total, in this case approximately 784.

At block 1040, data transfer interface 2140 determines the mappers, hash buckets, and database connections per job over an SQL row. The number of mappers defines the number of hash buckets to be used and database connections. From empirical data, approximately thirty-two queries per job (with each query pulling from a hash bucket of rows) were found to be optimal. Thirty-two is a function of how many total parallel threads used based on the output from the number of parallel threads and the overall concurrency achieved. A maximum of 784 threads, 32 queries per job, and using 4 threads per query, results in 128 threads for the job. This results in about six jobs concurrently. Thus, the selection of thirty-two queries per job is really a function of the overall concurrency achieved. If four threads per query and thirty-two queries per job, there will be a total of 128 parallel threads on the database per job.

Data transfer interface 2140 formulates a query of the desired information, defining the number of threads and hash buckets, assigning SQL table rows into a hash bucket, block 1050. It is understood by those familiar with the art that the query may include a database administrator user name and password, as well as the names of database servers 2000. Using the above example, the following query would be generated:

```
    sqoop import -D oraoop.jdbc.url.verbatim=true -D
mapred.child.java.opts = "-Xmx4096m"
      --connect
jdbc:oracle:thin:@//database:port/service_name
      --username user
      --password $PASS
      --query "select /*+ parallel(4)*/ to_char(col1_date,
'YYYY-MM-DD') as col1_str, table1.* from table1 where col1
_date between '01-JAN-2015' and '31-JAN-2015' and
\$CONDITIONS"          #Query to be moved
      --as-avrodatafile
      --compression-codec
org.apache.hadoop.io.compress.SnappyCodec
    -m 32                  #This defines how many parallel
connections (mappers), in this case we would like 32 to
match the number of hash buckets we have
      --target-dir
hdfs://nameservice1/user/admin/table1/2015/1
      --split-by "ora_hash(rowid, 31)"        #This
assigns every row to a bucket, in this case 32
      --boundary-query "select 0 min_bucket, 31 max_bucket
from dual"           #This describes the minimum and
```

-continued

```
maximum bucket values, in this case the smallest bucket is
0 and largest bucket is 31
      --fetch-size 100000
```

Using this query, the software framework 2130 receives the exported SQL query file, block 1060, and imports the SQL query file into the software framework distributed file system 2220, block 1070.

It is understood by those familiar with the art that the system described herein may be implemented in hardware, firmware, or software encoded on a non-transitory computer-readable storage medium.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method of transferring data from at least one relational database to a software framework comprising:
    determining, with a processor, a maximum number of parallel database threads for the at least one relational database;
    based on a predetermined percentage of the maximum number of parallel database threads, load balancing the maximum number of parallel database threads with the processor, resulting in a load-balanced number of parallel database threads;
    determining, with the processor, a number of hash buckets to be used based on a predetermined number of queries per job and a predetermined number of threads per query;
    formulating a formulated query to the at least one relational database with the processor based on a query of the desired information, the formulated query including the load-balanced number of parallel database threads and the number of hash buckets, the formulated query assigning a respective row of the at least one relational database into a hash bucket;
    receiving a query file from the at least one relational database based on the formulated query, the query file being stored on a non-transitory computer-readable storage medium; and
    importing the query file into the software framework, the software framework being stored on the non-transitory computer-readable storage medium.

2. The method of claim 1, wherein the formulated query hashes one or more rows of the at least one relational database into the number of hash buckets evenly.

3. The method of claim 2, wherein the at least one relational database is a Structured Query Language database.

4. The method of claim 3, wherein the software framework is configured for distributed storage and processing on computer clusters.

5. The method of claim 4, wherein the software framework is configured for distributed storage and processing on a plurality of computer clusters.

6. The method of claim 5, wherein each of the plurality of computer clusters comprises:

a microprocessor configured to process in parallel with the plurality of the computer clusters.

7. A computing device to transfer data from at least one relational database to a software framework comprising:
means for determining a maximum number of parallel database threads for the at least one relational database;
means for load balancing the maximum number of parallel database threads based on a predetermined percentage of the maximum number of parallel database threads, resulting in a load-balanced number of parallel database threads;
means for determining a number of hash buckets to be used based on a predetermined number of queries per job and a predetermined number of threads per query;
means for formulating a formulated query to the at least one relational database based on a query of the desired information, the formulated query including the load-balanced number of parallel database threads and the number of hash buckets, the formulated query assigning a respective row of the at least one relational database into a hash bucket;
means for receiving a query file from the at least one relational database based on the formulated query, the query file being stored on a non-transitory computer-readable storage medium; and
means for importing the query file into the software framework, the software framework being stored on the non-transitory computer-readable storage medium.

8. The device of claim 7, wherein the formulated query hashes one or more rows of the at least one relational database into the number of hash buckets evenly.

9. The device of claim 8, wherein the at least one relational database is a Structured Query Language database.

10. The device of claim 9, wherein the software framework is configured for distributed storage and processing on computer clusters.

11. The device of claim 10, wherein the software framework is configured for distributed storage and processing on a plurality of computer clusters.

12. The device of claim 11, wherein each of the plurality of computer clusters comprises:
a microprocessor configured to process in parallel with the plurality of the computer clusters.

13. A device to transfer data from at least one relational database to a software framework, said device comprising:
a processor programmed to:
determine a maximum number of parallel database threads for the at least one relational database,
load balance the maximum number of parallel database threads with said processor based on a predetermined percentage of the maximum number of parallel database threads, resulting in a load balanced number of parallel database threads,
determine a number of hash buckets to be used based on a predetermined number of queries per job and a predetermined number of threads per query,
formulate a formulated query to the at least one relational database based on a query of the desired information, the formulated query including the load balanced number of parallel database threads and the number of hash buckets, the formulated query assigning a respective row of the at least one relational database into a hash bucket,
receive a query file from the at least one relational database based on the formulated query, and
import the query file into a software framework; and
a non-transitory computer-readable storage medium coupled to said processor and configured to store the query file and the software framework.

14. The device of claim 13, wherein the formulated query hashes one or more rows of the at least one relational database into the number of hash buckets evenly.

15. The device of claim 14, wherein the at least one relational database is a Structured Query Language database.

16. The device of claim 15, wherein the software framework is configured for distributed storage and processing on computer clusters.

17. The device of claim 16, wherein the software framework is configured for distributed storage and processing on a plurality of computer clusters.

18. The device of claim 17, wherein each of the plurality of computer clusters comprises:
a microprocessor configured to process in parallel with the plurality of the computer clusters.

* * * * *